UNITED STATES PATENT OFFICE 2,637,738

REACTION OF SILANES WITH ALIPHATIC UNSATURATED COMPOUNDS

George H. Wagner, Kenmore, N. Y., assignor, by mesne assignments, to Union Carbide and Carbon Corporation, a corporation of New York No Drawing. Application September 17, 1949, Serial No. 116,405

8 Claims. (Cl. 260—448.2)

This invention relates to the synthesis of compounds containing carbon to silicon bonds.

It is known that organic derivatives of silicon containing the carbon to silicon bond can be formed by reacting a silane containing at least one silicon to hydrogen bond with unsaturated aliphatic compounds, such as acetylene and ethylene, as disclosed in the copending application of C. O. Strother and G. H. Wagner, Serial No. 702,084, filed October 9, 1946.

A particular form of catalyst has now been developed which greatly increases the utility and scope of the general reaction. The particular value of this catalyst is that it selectively promotes the 1,2 addition of the silicon-hydrogen bond (Si-H) across a pair of aliphatic carbon atoms linked by multiple bonds. In its most general state, the reaction may be illustrated as follows:

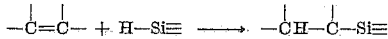

in which the vertically oriented bonds shown may also link the carbon atoms. Thus, the catalyst may be used to promote the addition of a silane, such as dichlorosilane, ethyl dichlorosilane, trichlorosilane or triethoxysilane, to a wide variety of unsaturated aliphatic compounds, such as acetylene, ethylene, propylene, butene-1, butene-2, butadiene, cyclohexene, allyl chloride, trichlorethylene, vinyl chloride, vinylidene fluoride and the like. In many instances it is possible to react a silane with a substituted ethylenic compound to form new derivatives of silicon which could not readily be formed in the presence of known catalysts.

The catalyst of this invention consists of platinum supported on finely-divided charcoal, such as commercial forms of decolorizing charcoal. It has been observed that platinum supported on charcoal is an extremely active and selective catalyst for the addition of silanes to aliphatic unsaturated compounds. It is distinguished from other forms of platinum catalysts by the extremely important fact that only minute amounts of platinum deposited on charcoal need be used in order to catalyze the reaction, whereas, when platinum is deposited on other supports, such as asbestos, calcium carbonate or barium sulfate, the amounts of platinum required for an active catalyst were greater by a factor of the order of magnitude of 10 to 100. Since platinum is a very expensive material, the economic advantages of the present catalyst are tremendous. The combination of platinum with charcoal is unique as charcoal by itself is not a catalyst for the silane addition reaction, nor are related metals, such as palladium, particularly effective when supported on charcoal.

Comparative tests to establish the superiority of the present catalyst were caried out by reacting acetylene with trichlorosilane at 300 p. s. i. gauge pressure for 30 to 60 minutes at 130° C. in the presence of various catalysts. The catalysts used, their amounts, and the analysis of the reaction products are tabulated below, the vinyl derivative listed being vinyl trichlorosilane, and the bis derivative being bis(trichlorosilyl) ethane resulting from the addition of another mole of trichlorosilane to the vinyl derivative.

TABLE I

*Comparison of various catalysts*

| Catalyst | G. Catalyst per Mole HSiCl₃ | Reaction Products, Mole Percent | | |
|---|---|---|---|---|
| | | HSiCl₃ | Vinyl | Bis |
| 5% Pt. on powdered charcoal | 0.06 | Nil | 75 | 25 |
| 0.77% Pt. on powdered charcoal | 0.06 | 27.5 | 60 | 12.5 |
| 5% Pt. on powdered CaCO₃ | 0.06 | Slight Reaction | | |
| 5% Pt. on powdered asbestos | 0.06 | Slight Reaction | | |
| 5% Pd. on powdered charcoal | 0.12 | 90 | 10 | Nil |
| Charcoal powder | 0.25 | No Reaction | | |

Reactions between acetylene and trichlorosilane can be obtained with the platinum on other supports, but higher temperatures, longer reaction times, and greater amounts of catalyst must be used.

Best results with the platinum on charcoal catalysts are obtained when the platinum catalysts are free of impurities and absorbed gases are removed from the catalyst before use. Also, for a given amount of platinum per mole of the silane, it is best to use more of a catalyst having a low concentration of platinum than a smaller amount of a catalyst having a larger concentration of platinum. The effect of the amount of catalyst used and the concentration of the platinum on the charcoal carrier is shown in the table below. The data were obtained by adding acetylene under 300 p. s. i. gauge pressure to 4 moles of trichlorosilane in a closed vessel at 130° C. for one hour in the presence of various catalysts.

TABLE II

*Comparison of platinum on charcoal catalysts*

| Percent Pt. on Catalyst | G. Catalyst per Mole HSiCl₃ | Mg. Pt. per Mole HSiCl₃ | Product Composition, Moles | | |
|---|---|---|---|---|---|
| | | | HSiCl₃ | Vinyl | Bis |
| 5.0 | 0.06 | 3 | Nil | 2.22 | 0.73 |
| 0.77 | 0.125 | 0.96 | 0.08 | 0.82 | 1.44 |
| 0.77 | 0.06 | 0.46 | 0.95 | 2.08 | 0.43 |
| 0.77 | 0.025 | 0.193 | 2.66 | 0.66 | 0.065 |
| 0.35 | 0.025 | 0.0875 | 3.3 | 0.14 | 0.04 |
| 0.20 | 0.050 | 0.1 | 0.5 | 2.75 | 0.25 |
| 0.20 | 0.025 | 0.05 | 2.96 | 0.30 | 0.03 |
| 0.05 | 0.05 | 0.025 | 2.56 | 0.51 | 0.02 |

The platinum on charcoal catalysts are available commercially or they can readily be made. For instance, $H_2PtCl_6 \cdot 6H_2O$ was dissolved in water, neutralized with KOH to a pH of 10 and diluted to give a concentration of 0.115 gram of platinum per liter. To 125 cc. of this solution (0.01437 gm. platinum) were added 25 cc. of water and 25 grams of Darco G-60 charcoal. Hydrogen was bubbled through the slurry for 30 minutes to precipitate the platinum. The catalyst was then filtered, washed free of chloride, and dried overnight at 125° C.

One of the most useful applications of the present catalyst is to promote the reaction of acetylene with trichlorosilane. Two products may be obtained in this reaction, as follows:

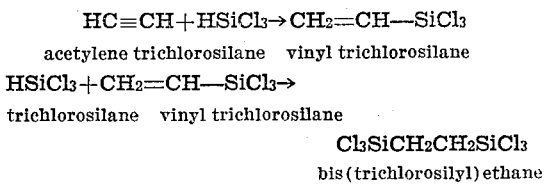

As indicated in Table II, the amount of platinum on the catalyst and the amount of catalyst used affect the relative proportions in which the vinyl to bis derivative are obtained. Other conditions which favor the production of the vinyl derivative are the use of higher molar ratios of acetylene to trichlorosilane, lower reaction temperatures and shorter reaction periods. The effect of the acetylene-silane ratio on the product composition was demonstrated with triethoxysilane which has a lower vapor pressure at reaction temperature and thus permits the acetylene pressure over it to be more significantaly varied and more precisely controlled. Results of the reaction of acetylene with a constant amount of triethoxysilane at 130° C. and at different acetylene pressures in the presence of a platinized charcoal catalyst are given below.

TABLE III

*Effects of acetylene pressure on vinyl/bis ratio in reaction with triethoxysilane*

| Acetylene Pressure p. s. i. (gauge) | Mole Ratio of Vinyl Triethoxysilane to Bis-(Triethoxysilyl)Ethane |
|---|---|
| 15 | Ca. 0 |
| 30 | 0.61 |
| 90 | 2.9 |

Although the reaction of acetylene and other unsaturated compounds with trichlorosilane or triethoxysilane can be carried out at atmospheric pressures, the yields are low, particularly with trichlorosilane, and in the case of acetylene the principal product is the bis derivative as indicated above. Therefore, it is preferred to carry out the reactions under pressures of 30 to 1,000 p. s. i. gauge at reaction temperatures of 100 to 300° C.

EXAMPLE 1.—REACTION OF ACETYLENE WITH TRICHLOROSILANE

Trichlorosilane (540 grams-4 moles) and 0.6 gram of charcoal containing 0.05% by weight of platinum were charged to an agitated, jacketed reactor. The reactor was brought to 128° C. and then acetylene was introduced at a cylinder pressure of 263 p. s. i. The temperature in the reactor rose to 159° C. during the first 17 minutes of the run, and then gradually dropped to 133° C. at the end of 60 minutes when the run was finished.

The product amounted to 584 grams of which 410 grams (2.54 moles) was vinyl trichlorosilane (B. P. 91° C.); 89 grams (0.3 mole) was bis(trichlorosilyl) ethane (B. P. 202° C.) and the balance was substantially trichlorosilane.

EXAMPLE 2.—REACTION OF ACETYLENE WITH TRIETHOXYSILANE

Triethoxysilane (575 grams-3.5 moles) and 0.10 gram of a charcoal-platinum catalyst containing 0.77% pt. were charged to the reactor described in Example 1 and acetylene introduced under a pressure of 300 p. s. i. at a temperature of 130° C. for 30 minutes.

The product contained 1.77 moles of vinyl triethoxysilane (B. P. 156–158° C.); 0.69 mole of bis(triethoxysilyl)ethane (B. P. 256° C.), and 0.21 mole of unreacted trichlorosilane.

EXAMPLE 3.—REACTION OF BUTADIENE WITH TRICHLOROSILANE

Butadiene (108 grams-2 moles) and trichlorosilane (271 grams-2 moles) and 1 gram of a platinum-charcoal catalyst containing 0.77% pt. were charged to a jacketed, agitated reactor. The reactants were heated to 160° C. under a maximum pressure of 350 p. s. i. for 2.5 hours.

There were isolated from the reaction products 26 grams of unreacted silane and butadiene, 154 grams (0.8 mole) of butenyl trichlorosilane ($CH_3CH=CHCH_2SiCl_3$, B. P. 142–143° C.) and 102 grams (0.3 mole) of a residue which was largely bis(trichlorosilyl) butane

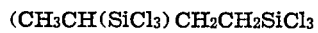

B. P. 250° C. at 750 mm. and 102–104 at 4 mm.). This residue product resulted from the addition of another mole of trichlorosilane to the first product formed.

The products formed with butadiene and the platinized charcoal were straight chain compounds, whereas other catalysts tend to give cyclic derivatives of the hydrocarbon in this reaction.

EXAMPLE 4.—REACTION OF ALLYL CHLORIDE AND TRICHLOROSILANE

Allyl chloride (306 grams-4 moles) and trichlorosilane (540 grams-4 moles) and 1 gram of a charcoal-platinum catalyst were charged to a jacketed, agitated reactor and heated to 150–166° C. for 0.8 hour at 215 to 310 p. s. i. pressure.

The reaction products totaled 834 grams in which the following wt. percent distribution existed.

|   | Percent |
|---|---|
| Unreacted allyl chloride and $HSiCl_3$ | 24.1 |
| Silicon tetrachloride | 7.9 |
| n-Propyl trichlorosilane (B. P. 124° C.) | 12.9 |
| gamma-Chloropropyltrichlorosilane (B. P. 180° C.) | 51.4 |
| Residue | 3.3 |

The silicon tetrachloride and n-propyl trichlorosilane were formed as by-products. The following equations may explain the formation of these products:

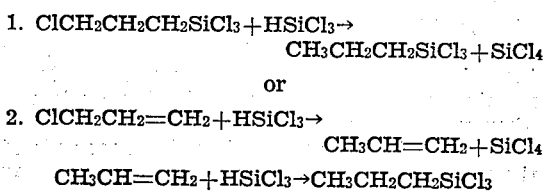

EXAMPLE 5.—THE REACTION OF TRICHLOROETHYLENE AND TRICHLOROSILANE

This reaction does not follow the usual course in that the product formed has the same degree of unsaturation as the olefinic starting material. The products of this reaction are beta,beta-dichlorovinyltrichlorosilane ($Cl_2C=CHSiCl_3$—B. P. 162.5° C.) and silicon tetrachloride.

The reaction was carried out by heating one mole of trichlorosilane, one mole of trichloroethylene and 0.5 gram of platinum-charcoal catalyst (0.5% pt.) in a rocking, 300 cc. stainless steel pressure reactor. The results of several runs under different conditions are given in the table below.

TABLE IV

*Preparation of beta,beta-dichlorovinyltrichlorosilane from trichlorosilane and trichloroethylene*

| Reaction Temp. (° C.) | Time, Hrs. | SiCl₄ Conversion (Mol Percent) | SiCl₄ Efficiency [1] (Mol Percent) | $CCl_2=CHSiCl_3$ Conversion (Mol Percent) | $CCl_2=CHSiCl_3$ Efficiency [1] (Mol Percent) | Efficiency [2] (Mol Percent) |
|---|---|---|---|---|---|---|
| 300 | 15 | 39.4 | 39.4 | 21.2 | 21.2 | 28.8 |
| 250 | 1½ | 14.5 | 23.9 | 20.7 | 54.2 | 52.5 |
| 200 | 1½ | 8.6 | 25.4 | 6.3 | 18.6 | 33.8 |
| 200 | 18 | 35.5 | 44.2 | 18.1 | 22.5 | 41.9 |
| 200 | 20 | 20.2 | 26.2 | 18.7 | 24.2 | 44.3 |

[1] Based on $HSiCl_3$ consumed.
[2] Based on $CHCl=CCl_2$ consumed.

EXAMPLE 6.—THE REACTION OF TRICHLOROSILANE AND ETHYLENE

Four moles of $HSiCl_3$ were reacted with ethylene at 300 p. s. i. in a 300 cc. reactor. As catalyst, 0.05 gram of 0.2 percent platinum on charcoal per mole of $HSiCl_3$ was added. After one hour at 130° C., the product contained 97 percent $C_2H_5SiCl_3$ and 3 percent unreacted $HSiCl_3$.

EXAMPLE 7.—THE REACTION OF VINYLIDENE FLUORIDE AND TRICHLOROSILANE

One hundred and thirty-five grams of $HSiCl_3$ and one gram of 0.77 percent platinum on charcoal catalyst were placed in a 300 cc. reactor. Fifty-nine grams of vinylidene fluoride were added. After heating for two hours at 500 p. s. i. pressure and 150° C., 127 grams of product were recovered. This product contained 75.2 grams of unreacted $SiHCl_3$ and 17.6 grams of beta,beta-difluoroethyltrichlorosilane. There was a residue of 4.9 grams.

The product $F_2CHCH_2SiCl_3$ is a new chemical compound having the following properties:

| | | |
|---|---|---|
| Wt. percent chlorine | found | 53.0 |
| | theory | 53.3 |
| Wt. percent fluorine | found | 18.5 |
| | theory | 19.0 |
| Density, g./cc.—25° C | | 1.43 |
| Refractive Index | | 1.4050 |
| Boiling point—°C | | 104–105.5 |

This new fluorinated ethyl trichlorosilane forms useful stable resins on hydrolysis.

EXAMPLE 8.—THE REACTION OF DICHLOROSILANE WITH ETHYLENE

A mixture containing 37 percent $H_2SiCl_2$ and 63 percent $HSiCl_3$ was placed in a 3 liter reaction vessel, with 0.02 gram of 5 percent platinum on charcoal catalyst per 100 grams of a mixture. Ethylene was added amounting to 106 percent of the amount theoretically required for the reaction below.

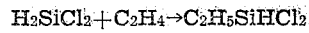

$$H_2SiCl_2 + C_2H_4 \rightarrow C_2H_5SiHCl_2$$

After two hours, the $H_2SiCl_2$ was 94 percent converted to $C_2H_5SiHCl_2$ and 6 percent to

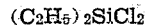

$$(C_2H_5)_2SiCl_2$$

The initial temperature was 160° C. and the maximum was 195° C. The maximum pressure was 780 p. s. i. A small amount of $C_2H_5SiCl_3$ was also found.

This example shows that the hydrogen atoms in dichlorosilane are more reactive than the hydrogen atom in trichlorosilane.

EXAMPLE 9.—THE REACTION OF ETHYLDICHLOROSILANE AND ACETYLENE

Five hundred and fifteen grams of ethyl dichlorosilane ($C_2H_5SiHCl_2$) and 0.1 gram of 0.2 percent platinum on charcoal catalyst were placed in an 800 cc. vessel. Acetylene was added and the vessel was heated to about 110° C. to initiate the reaction. The temperature rose due to heat of reaction to 210–220° C. and the pressure rose to 300 p. s. i. After a total time of 30 minutes, the temperature dropped indicating that the reaction was complete. The product contained 321 grams of ethyl vinyl dichlorosilane and 231 grams of bis(ethyl dichlorosilyl)ethane indicating that the following reactions took place.

$$C_2H_5SiHCl_2 + C_2H_2 \rightarrow (C_2H_5)(CH_2=CH)SiCl_2$$

$$(C_2H_5)(CH_2=CH)SiCl_2 + C_2H_5SiHCl_2 \rightarrow (C_2H_5SiCl_2)C_2H_4(Cl_2SiC_2H_5)$$

The properties of these compounds are as follows:

| | Boiling Pt. | Density, 25° C. | Refractive Index $N_D^{20}$ |
|---|---|---|---|
| $(C_2H_5)(CH_2=CH)SiCl_2$ | 122° C./750 mm | 1.058 g./cc. | 1.4405 |
| $(C_2H_5SiCl_2)C_2H_4(Cl_2SiC_2H_5)$ | 248° C./750 mm / 94° C./4 mm | 1.192 g./cc. | 1.4742 |

EXAMPLE 10.—THE REACTION OF ETHYLDICHLOROSILANE WITH ALLYL CHLORIDE

Four mols of ethyldichlorosilane were reacted with allyl chloride in the presence of one gram of 0.2 per cent platinized charcoal in a 1¼-liter steam jacketed stainless steel rocking pressure vessel. The vessel was heated to 150° C. with steam condensate, and an exothermic reaction occurred which raised the reaction temperature to 180° C. in a few minutes. The product was fractionated through a 12-plate column at reduced pressure and the following materials were obtained: gamma - chloropropylethyldichlorosilane (40 per cent conversion); ethylpropyldichlorosilane (21 per cent conversion), ethyltrichlorosilane (21 per cent conversion).

The ethylpropyl dichlorosilane was probably formed by a mechanism similar to that discussed in Example 4.

What is claimed is:

1. In the process for making compounds containing the carbon to silicon bond by reacting one of the group consisting of unsaturated aliphatic hydrocarbons and halogen-substituted aliphatic unsaturated hydrocarbons with a silane containing at least one hydrogen atom and from two to three chlorine atoms attached to the silicon atom and in which any valence of the silicon atom not satisfied with hydrogen or chlorine is satisfied with a monovalent hydrocarbon radical, the step of promoting the reaction with a catalyst composed of platinum supported on charcoal.

2. Process as claimed in claim 1 in which the catalyst contains from 0.05 to 5% platinum by weight.

3. In the process for making compounds containing the carbon to silicon bond by reacting an unsaturated aliphatic hydrocarbon with a silane containing at least one hydrogen atom and from two to three chlorine atoms attached to the silicon atom and in which any valence of the silicon atom not satisfied with hydrogen or chlorine is satisfied with a monovalent hydrocarbon radical, the step of promoting the reaction with a catalyst composed of platinum supported on charcoal.

4. In the process for making compounds containing the carbon to silicon bond by reacting an unsaturated aliphatic hydrocarbon with a silane of the formula $Si(H)_x(Cl)_y$ where $x$ is an integer from 1 to 2 and $y$ is an integer from 2 to 3 and where the sum of $x$ and $y$ is 4, the step of promoting the reaction with a catalyst composed of platinum supported on charcoal.

5. In the process for making vinyl trichlorosilane by reacting acetylene and trichlorosilane, the step of promoting the reaction with a catalyst composed of platinum supported on charcoal.

6. In the process for making ethyl trichlorosilane by reacting ethylene and trichlorosilane, the step of promoting the reaction with a catalyst composed of platinum supported on charcoal.

7. Process for making beta,beta-difluoroethyltrichlorosilane which comprises reacting vinylidene fluoride and trichlorosilane in the presence of a catalyst composed of platinum supported on charcoal.

8. Beta,beta-difluoroethyltrichlorosilane.

GEORGE H. WAGNER.

References Cited in the file of this patent

UNITED STATES PATENTS

| Number | Name | Date |
|---|---|---|
| 2,379,821 | Miller | July 3, 1945 |

OTHER REFERENCES

Sommor et al., Jour. Am. Chem. Soc., vol. 69 (1947), p. 188.

Barry et al., Jour. Am. Chem. Soc., vol. 69 (1947), p. 2916.

Burkhard et al., Jour. Am. Chem. Soc., (1947), pp. 2687–89.

Pietrusza, Jour. Am. Chem. Soc., vol. 70, (1948), pp. 484–86.

Wagner et al., Jour. Am. Chem. Soc., vol. 71 (1949), pp. 3567–68.

Agre, Jour. Am. Chem. Soc., vol. 71 (Jan. 1949), pp. 300–04, rec'd August 5, 1948.